S. JOHNSON.
Tank for Stock-Cars.
No. 201,250.  Patented March 12, 1878.
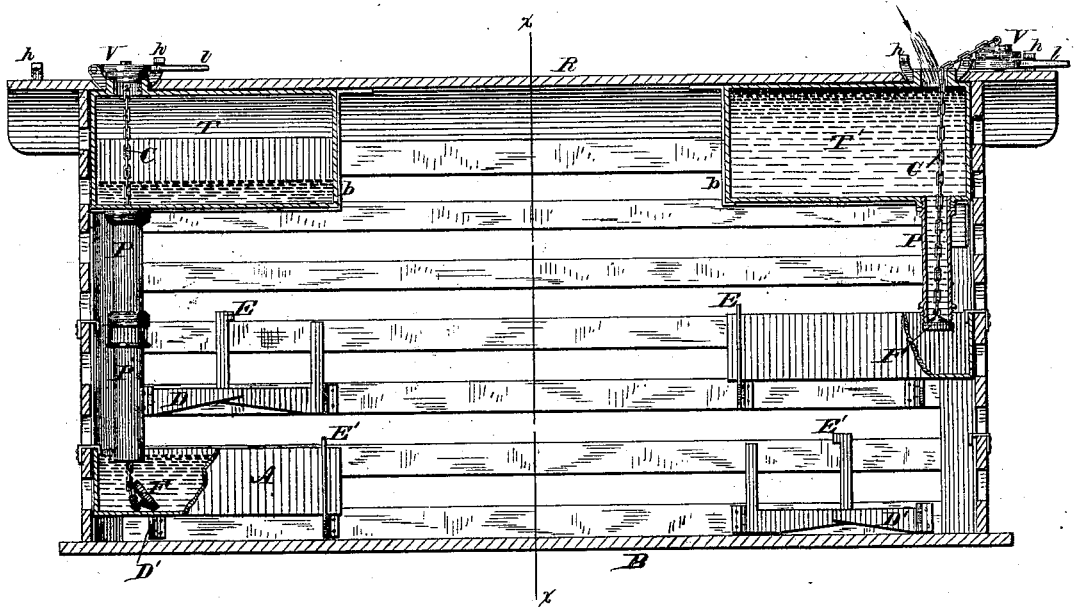
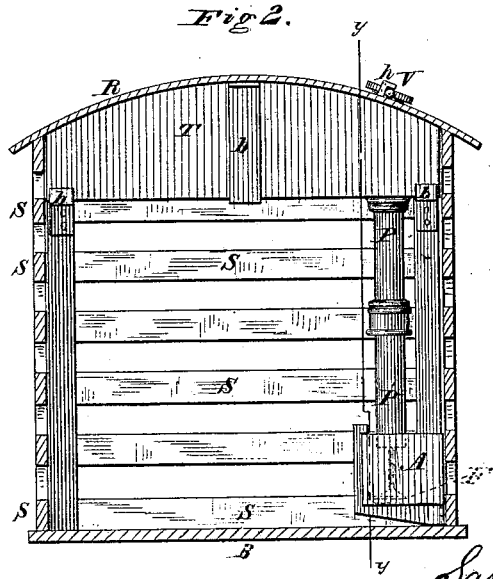
Witnesses.
Harry King
Inventor.
Samuel Johnson,
By his Attorneys.
Stansbury & Munn.

UNITED STATES PATENT OFFICE.

SAMUEL JOHNSON, OF PHILADELPHIA, PENNSYLVANIA.

IMPROVEMENT IN TANKS FOR STOCK-CARS.

Specification forming part of Letters Patent No. 201,250, dated March 12, 1878; application filed February 13, 1878.

*To all whom it may concern:*

Be it known that I, SAMUEL JOHNSON, of Philadelphia, in the county of Philadelphia and State of Pennsylvania, have invented certain new and useful Improvements in Watering-Tanks for Railroad Cattle-Cars; and I do hereby declare that the following is a full, clear, and exact description of my invention, which will enable others skilled in the art to which it appertains to make and use the same, reference being had to the accompanying drawings, and to letters of reference marked thereon, which form a part of this specification, and show, in—

Figure 1, a vertical longitudinal section, on line $y$ $y$ of Fig. 2, of a cattle-car having my improved watering devices attached, and in Fig. 2 a transverse vertical section of the same on line $x$ $x$ of Fig. 1.

The same letter indicates the same part in both figures.

My invention consists in providing a cattle-car, or car for the transportation of animals on railroads, with a watering apparatus, consisting of a tank located in the upper part of the car, and provided with receiving and delivering valves and pipes of peculiar construction, and communicating by adjustable pipes with troughs or basins adjustably attached to the sides of the car, so that they can be raised or lowered, to adapt them for use by large or small animals during their transportation, all as hereinafter more particularly set forth.

In the drawings, B marks the bottom, S the slatted sides, and R the arched roof, of an ordinary cattle-car. At the top of the car, under the roof, I place one or more tanks, T T', of sufficient size to carry an ample supply of water. These tanks are supported upon brackets $b$ $b$, and are fed through openings in the top, which, when closed, are hermetically sealed by the hinged and packed valves V, resting upon rubber seats, so as to be perfectly air-tight. The valves V are attached to hinged levers $l$, by means of which they are opened and closed, and locked in either position by the ends of the levers passing under the hooks $h$ $h$, which hold them securely. To the under side of valve V is attached a chain, C, connected with a plug, F, which fits the lower end of pipe P, leading from the bottom of the tank into the drinking basin or trough A, attached below it to the side of the car.

The chain C is of such length that when the valve V is thrown open to admit a supply of water to the tank the plug F will be drawn up, so as to stop the lower end of pipe P and prevent the water from flowing into the trough A; but when the valve V is closed the plug F will fall out of the mouth of pipe P and allow water to enter the trough until it is filled to a level with the lower opening of pipe P.

The drinking-trough A may be affixed to the car in a higher or lower position, as the car is used for cattle and horses, or for sheep and swine. It is supported in the higher position by the hinged swinging brackets D E, and in the lower position by similar brackets D' E'. When the trough is in the lower position the pipe P is lengthened correspondingly by coupling to it an additional section, P', as shown in Figs. 1 and 2.

The operation, which has been partially indicated in the description, is as follows: When the tank is receiving its supply of water the valve V, as seen at the right-hand end of Fig. 1, is thrown open, and the plug F drawn up into the lower end of pipe P, so as to prevent the escape of water from the tank. When the tank is full, the valve V is closed and locked by lever $l$, as shown at the other end of Fig. 1, and the plug F falls out of the mouth of the discharge-pipe, and allows water to flow from the tank into the trough until the latter is filled to the level of the mouth of the pipe. As the water is consumed by the animals a fresh supply descends into the trough, and keeps it filled to a uniform level until the tank is exhausted.

I claim—

1. The combination, in a car for the transportation of animals, of the tank T, located as described, pipe P, trough A, valve V, and plug F, connected by chain C, all constructed, arranged, and operating substantially as described.

2. The combination of the hinged valve V, lever $l$, hooks $h$ $h$, chain C, plug F, tank T, and pipe P, in the manner and for the purpose specified.

3. The combination, with the tank T and trough A, of the pipes P P' and brackets D E D' E', all constructed, arranged, and operating in the manner and for the purpose set forth.

In testimony that I claim the foregoing as my own invention I affix hereto my signature in presence of two witnesses.

SAMUEL JOHNSON.

Witnesses:
H. M. HESTON,
R. T. FRAILEY.